US008458802B2

(12) United States Patent
Baca et al.

(10) Patent No.: US 8,458,802 B2
(45) Date of Patent: Jun. 4, 2013

(54) METHOD AND DEVICE FOR MANAGING DIGITAL USAGE RIGHTS OF DOCUMENTS

(75) Inventors: Jim Baca, Corrales, NM (US); Selim Aissi, Beaverton, OR (US); Alan Ross, Shingle Springs, CA (US); Tobias Kohlenberg, Portland, OR (US); Dennis Morgan, Pine Grove, CA (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 13/078,951

(22) Filed: Apr. 2, 2011

(65) Prior Publication Data

US 2012/0255026 A1 Oct. 4, 2012

(51) Int. Cl.
*H04L 29/06* (2006.01)

(52) U.S. Cl.
USPC ............................................ 726/26; 713/189

(58) Field of Classification Search
USPC ............................................................ 726/26
See application file for complete search history.

(56) References Cited

U.S. PATENT DOCUMENTS

| 2004/0030651 | A1* | 2/2004 | Kim et al. ........................ 705/51 |
| 2004/0127196 | A1 | 7/2004 | Dabbish et al. |
| 2004/0205028 | A1 | 10/2004 | Verosub et al. |
| 2005/0278716 | A1* | 12/2005 | Koppen et al. ................. 717/168 |
| 2006/0010500 | A1* | 1/2006 | Elazar et al. .................... 726/27 |
| 2008/0184359 | A1 | 7/2008 | Khedouri et al. |
| 2008/0195864 | A1* | 8/2008 | Kim et al. ...................... 713/169 |
| 2008/0270913 | A1* | 10/2008 | Singer et al. .................. 715/748 |
| 2009/0100060 | A1* | 4/2009 | Livnat et al. ....................... 707/9 |
| 2009/0165083 | A1 | 6/2009 | Mclean et al. |
| 2012/0117182 | A1* | 5/2012 | Mountanos .................. 709/217 |

OTHER PUBLICATIONS

"Digital rights management", from Wikipedia, the free encyclopedia, Document retrieved on Jul. 1, 2011, 21 pages, Web page available at: http://en.wikipedia.org/wiki/Digital_rights_management.
"Enterprise content management", from Wikipedia, the free encyclopedia, Document retrieved on Jul. 1, 2011, 15 pages, Web page available at: http://en.wikipedia.org/wiki/Enterprise_content_management.
"Information Rights Management", from Wikipedia, the free encyclopedia, Document retrieved on Jul. 1, 2011, 1 page, Web page available at: http://en.wikipedia.org/wiki/Information_Rights_Management.
Gaudet, Ed, "DRM vs. ERM: battle to control data", Published online on Dec. 15, 2006, 2 pages, Web page available at: http://www.networkworld.com/news/tech/2006/121806techupdate.html.
International Search Report and Written Opinion received for International Application No. PCT/US2011/066959, mailed Sep. 20, 2012, 11 pages.

* cited by examiner

*Primary Examiner* — Edward Zee
*Assistant Examiner* — Yogesh Paliwal
(74) *Attorney, Agent, or Firm* — Barnes & Thornburg, LLP

(57) ABSTRACT

A method, device, and system for managing digital usage rights of documents includes a mobile computing device having a digital rights management (DRM) enforcement engine included therein. The mobile computing device may communicate with a server, such as an enterprise digital rights management (EDRM) server, to retrieve a secured document and an associated document usage rights policy. The document and usage rights policy are stored in a secured storage of the mobile computing device. The DRM enforcement engine of the mobile computing device provides access to the requested document while locally enforcing the associated document usage rights policy. In some embodiments, the mobile computing device may act as a proxy for other computing devices communicatively coupled to the mobile computing device and/or act as a local EDRM to such computing devices.

18 Claims, 5 Drawing Sheets

METHOD AND DEVICE FOR MANAGING DIGITAL USAGE RIGHTS OF DOCUMENTS

BACKGROUND

Digital rights management (DRM) technologies provide access and usage control over secured documents by limiting digital privileges (e.g., viewing rights, modification rights, etc.) of individuals requesting access to such documents. The digital privileges for the secured documents are typically defined by a digital usage rights policy, which may correlate digital privileges to particular criteria such as the identity of the requesting individual.

Enterprise Digital Rights Management (EDRM) systems are used by corporations and other large entities to provide enterprise-wide usage control and monitoring of secured documents by a large population of users. Typically, EDRM systems are embodied as one or more servers that are accessed by client computers over a network.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
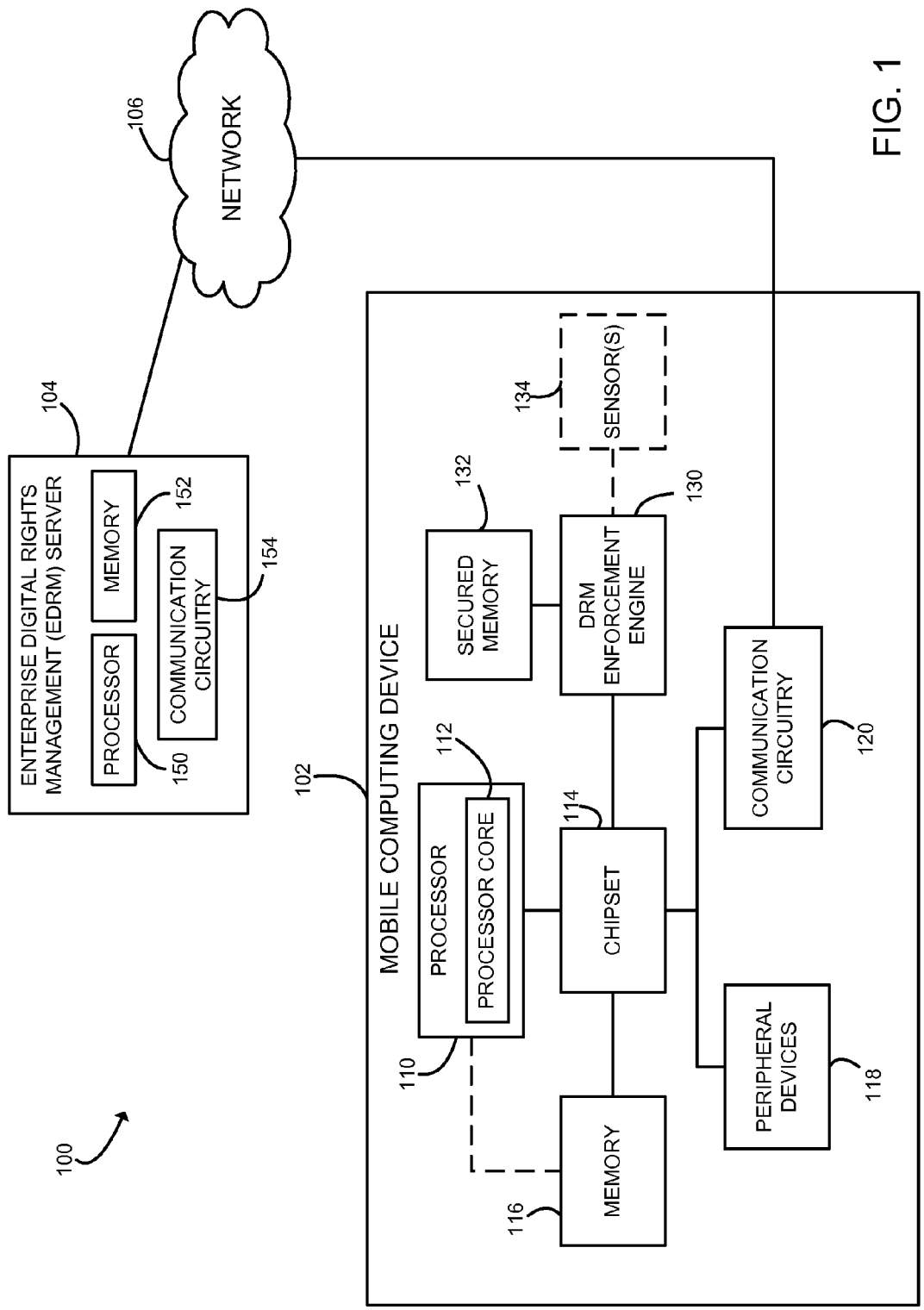
FIG. 1 is a simplified block diagram of one embodiment of a system for managing digital usage rights of documents on a mobile computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a tangible, machine-readable medium, which may be read and executed by one or more processors. A tangible, machine-readable medium may include any tangible mechanism for storing or transmitting information in a form readable by a machine (e.g., a computing device). For example, a tangible, machine-readable medium may include read only memory (ROM); random access memory (RAM); magnetic disk storage media; optical storage media; flash memory devices; and others.

Typical EDRM servers provide a single point of enforcement of the usage rights policy for all secured documents. However, such digital rights enforcement can only be accomplished when access to such EDRM servers is available. As such, access to secured documents on the EDRM servers is provided only during those times in which network access to the EDRM servers is available. Alternatively, if the document usage rights are only enforced when network access to the EDRM servers are available, control over the secured documents is compromised.

Referring now to FIG. 1, a system 100 for managing digital usage rights of documents includes a mobile computing device 102 and an enterprise digital rights management (EDRM) server 104, which are capable of communicating with each other over a network 106. As discussed in more detail below, the mobile computing device 102 includes a local digital rights management (DRM) enforcement engine 130 and, as such, the system 100 includes multiple points of enforcement of digital usage rights policies (i.e., at least the EDRM server 104 and the mobile computing device 102).

In use, the mobile computing device 102 is configured to communicate with the EDRM server 104 over the network 106 to download secured documents from the server 104. Additionally, a document usage rights policy associated with the requested document is downloaded from the EDRM server 104. The usage rights policy defines the digital rights associated with the document and correlates those rights to particular criteria. Such digital rights may include any digital right commonly associated with documents such as viewing rights, saving rights, modification rights, deletion rights, etc. The document usage rights policy also correlates the digital rights to particular criteria such as the identity of the user of the mobile computing device 102 (e.g., whether the user has viewing rights, modification rights, etc.), the identity of the mobile computing device 102 (e.g., whether the document can be saved on the particular mobile computing device 102), the location of the mobile computing device 102 (e.g., whether the requested document can be accessed in the present location of the mobile computing device), the current date and/or time (e.g., whether the requested document can be accessed at the current time), the validity of a passkey or password (e.g., whether the user entered a correct password or key), the connectivity status of the EDRM server 104 (e.g., whether the mobile computing device 102 can communicate with the EDRM server 104), and/or other criteria such as those criteria commonly associated with enterprise digital rights management systems.

After downloading the secured document and associated digital usage rights policy from the EDRM server 104, the document and policy are stored in a secured memory location of the mobile computing device 102. As discussed in more detail below, such downloading process may include authentication of the mobile computing device 102 to the EDRM server 104, exchanging of cryptographic keys, and/or other security measures. Additionally, the document and associated digital usage rights policy may be downloaded from the EDRM server 104 and stored on the mobile computing device 102 in an encrypted format. The local DRM enforcement engine 130 of the mobile computing device 102 enforces the digital usage rights policy associated with the document on the mobile computing device 102. That is, even if network connectivity to the EDRM server 104 is unavailable, access and usage of the secured document on the mobile computing device 102 is controlled and managed according to the usage rights policy associated with the secured document by the DRM enforcement engine 130. For example, if the usage rights policy dictates that the associated document cannot be modify by the current user, the DRM enforcement engine 130 ensures that no modification can be made to the document on the mobile computing device 102. In this way, the system 100 includes multiple points of enforcement of the digital usage rights policies.

Although only one mobile computing device 102, one EDRM server 104, and one network 106 are illustratively shown in FIG. 1, the system 100 may include any number of mobile computing devices 102, EDRM servers 104, and networks 106 of similar or dissimilar architecture. For example, the system 100 may include multiple mobile computing devices 102, each including a local DRM enforcement engine, configured to communicate with one or more EDRM servers 104 to retrieve secured documents and associated usage rights policies from the servers 104.

The mobile computing device 102 may be embodied as any type of mobile computing device capable of performing the functions described herein. For example, the mobile computing device 102 may be embodied as a smart phone, a mobile internet device, a handheld computer, a laptop computer, a personal digital assistant, a telephony device, or other portable computing device. In the illustrative embodiment of FIG. 1, the mobile computing device 102 includes a processor 110, a chipset 114, a memory 116, one or more peripheral devices 118, and communication circuitry 120. In some embodiments, several of the foregoing components may be incorporated on a motherboard of the mobile computing device 102, while other components may be communicatively coupled to the motherboard via, for example, a peripheral port. Furthermore, it should be appreciated that the mobile computing device 102 may include other components, sub-components, and devices commonly found in a computer and/or computing device, which are not illustrated in FIG. 1 for clarity of the description.

The processor 110 of the mobile computing device 102 may be embodied as any type of processor capable of executing software/firmware, such as a microprocessor, digital signal processor, microcontroller, or the like. The processor 110 is illustratively embodied as a single core processor having a processor core 112. However, in other embodiments, the processor 110 may be embodied as a multi-core processor having multiple processor cores 112. Additionally, the mobile computing device 102 may include additional processors 110 having one or more processor cores 112.

The chipset 114 of the mobile computing device 102 may include a memory controller hub (MCH or "northbridge"), an input/output controller hub (ICH or "southbridge"), and a firmware device. The firmware device of the chipset 114 may be embodied as a memory device for storing Basic Input/Output System (BIOS) data and/or instructions and/or other information (e.g., a BIOS driver used during booting of the mobile computing device 102). However, in other embodiments, chipsets having other configurations may be used. For example, in some embodiments, the chipset 114 may be embodied as a platform controller hub (PCH). In such embodiments, the memory controller hub (MCH) may be incorporated in or otherwise associated with the processor 110, and the processor 110 may communicate directly with the memory 116 (as shown by the hashed line in FIG. 1).

The processor 110 is communicatively coupled to the chipset 114 via a number of signal paths. These signal paths (and other signal paths illustrated in FIG. 1) may be embodied as any type of signal paths capable of facilitating communication between the components of the mobile computing device 102. For example, the signal paths may be embodied as any number of wires, cables, light guides, printed circuit board traces, via, bus, intervening devices, and/or the like.

The memory 116 of the mobile computing device 102 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 116 is communicatively coupled to the chipset 114 via a number of signal paths. Although only a single memory device 116 is illustrated in FIG. 1, in other embodiments, the mobile computing device 102 may include additional memory devices. Various data and software may be stored in the memory device 116. For example, one or more operating systems, applications, programs, libraries, and drivers that make up the software stack executed by the processor 110 may reside in memory 116 during execution. Furthermore, software and data stored in memory 116 may be swapped between the memory 116 and a data storage device of the peripheral devices 118 as part of memory management operations.

The peripheral devices 118 of the mobile computing device 102 may include any number of peripheral or interface devices. For example, the peripheral devices 118 may include a display, a keyboard, a mouse, one or more data storage devices such as an internal or external hard drive, and/or other peripheral devices. The particular devices included in the peripheral devices 118 may depend upon, for example, the intended use of the mobile computing device 102. The peripheral devices 118 are communicatively coupled to the chipset 114 via a number of signal paths thereby allowing the chipset 114 and/or processor 110 to receive inputs from and send outputs to the peripheral devices 118.

The communication circuitry 120 of the mobile computing device 102 may be embodied as any number of devices and circuitry for enabling communications between the mobile computing device 102 and the EDRM server 104 over the network 106. The communication circuitry 120 is communicatively coupled to the chipset 114 via a number of signal paths. The communication circuitry 120 may include one or more wired and/or wireless network interfaces to facilitate communications over the wired and/or wireless portions of the network 106.

As discussed above, the mobile computing device 102 also includes a digital rights management (DRM) enforcement engine 130. The DRM enforcement engine 130 is embodied as hardware and associated firmware/software configured to enforce the usage rights policies associated with secured documents on the mobile computing device 102. For example, the DRM enforcement engine 130 may be embodied as a security co-processor, a trusted platform module (TPM) and/or other security enhancing hardware and associated firmware/software modules. In some embodiments, the DRM enforcement engine 130 may form part of the chipset 114 (e.g., in embodiments in which the DRM enforcement engine 130 is embodied as a security processor).

The mobile computing device 102 also includes secured memory 132, which is communicatively coupled to the DRM enforcement engine 130 via a number of signal paths. The secured memory 132 is dedicated to the DRM enforcement engine 130. In some embodiments, the secured memory 132 may be embodied as a plurality of secured memory locations of the memory 116 or as a separate memory device accessible only by the DRM enforcement engine 130. As discussed in more detail below, the DRM enforcement engine 130 is configured to store the secured documents and associated usage rights policies in the secured memory 132.

In some embodiments, the mobile computing device 102 may also include one or more sensors 134. The sensors 134 may be embodied as any type of sensor capable of generating context data regarding the mobile computing device 102. For example, the sensors 134 may be embodied as global positioning system (GPS) circuitry configured to generate signal data indicative of a location of the mobile computing device 102, a biometric reader configured to generate signal data indicative of some biometric parameter (e.g., the user's fingerprint), and/or the like. In such embodiments, the DRM enforcement engine 130 may be configured to enforce the document usage rights policies based on the signal data generated by the sensors 134 as discussed in more detail below.

The network 106 may be embodied as any number of various wired and/or wireless telecommunication networks. For example, the network 106 may be embodied as or otherwise include one or more cellular networks, telephone networks, local or wide area networks publicly available global networks (e.g., the Internet), or any combination thereof. Furthermore, the network 106 may include any number of additional devices to facilitate communication between the mobile computing device 102 and the EDRM server 104 such as routers, switches, intervening computers, and/or the like. The mobile computing device 102 and the EDRM server 104 may use any suitable communication protocol to communicate with each other over the network 106 depending on, for example, the particular type of network(s) 106.

The EDRM server 104 may be embodied as any type of enterprise DRM server configured to perform typical EDRM functions such as document usage monitoring and digital rights enforcement. Additionally, unlike a typical enterprise DRM server, the EDRM server 104 is configured to also transmit the digital usage rights policy associated with a particular requested document as discussed in more detail below. In the illustrative embodiment of FIG. 1, the EDRM server 104 includes a processor 150, a memory 152, and communication circuitry 154. In some embodiments, several of the foregoing components may be incorporated on a motherboard of the EDRM server 104, while other components may be communicatively coupled to the motherboard via, for example, a peripheral port. Furthermore, it should be appreciated that the EDRM server 104 may include other components, sub-components, and devices commonly found in a computer server, which are not illustrated in FIG. 1 for clarity of the description.

The processor 150 of the EDRM server 104 may be embodied as any type of processor capable of executing software/firmware, such as a microprocessor, digital signal processor, microcontroller, or the like. Additionally, the processor 150 may be embodied as a single core processor, a multi-core processor, or multiple processors, each having one or more cores. The memory 152 of the EDRM server 104 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Various data and software may be stored in the memory device 152. For example, one or more operating systems, applications, programs, libraries, and drivers that make up the software stack executed by the processor 150 may reside in memory 152 during execution. The communication circuitry 154 of the EDRM server 104 may be embodied as any number of devices and circuitry for enabling communications between the EDRM server 104 and the mobile computing device 102 over the network 106. For example, the communication circuitry 154 may include one or more wired and/or wireless network interfaces to facilitate communications over the wired and/or wireless portions of the network 106.

Figure 2:
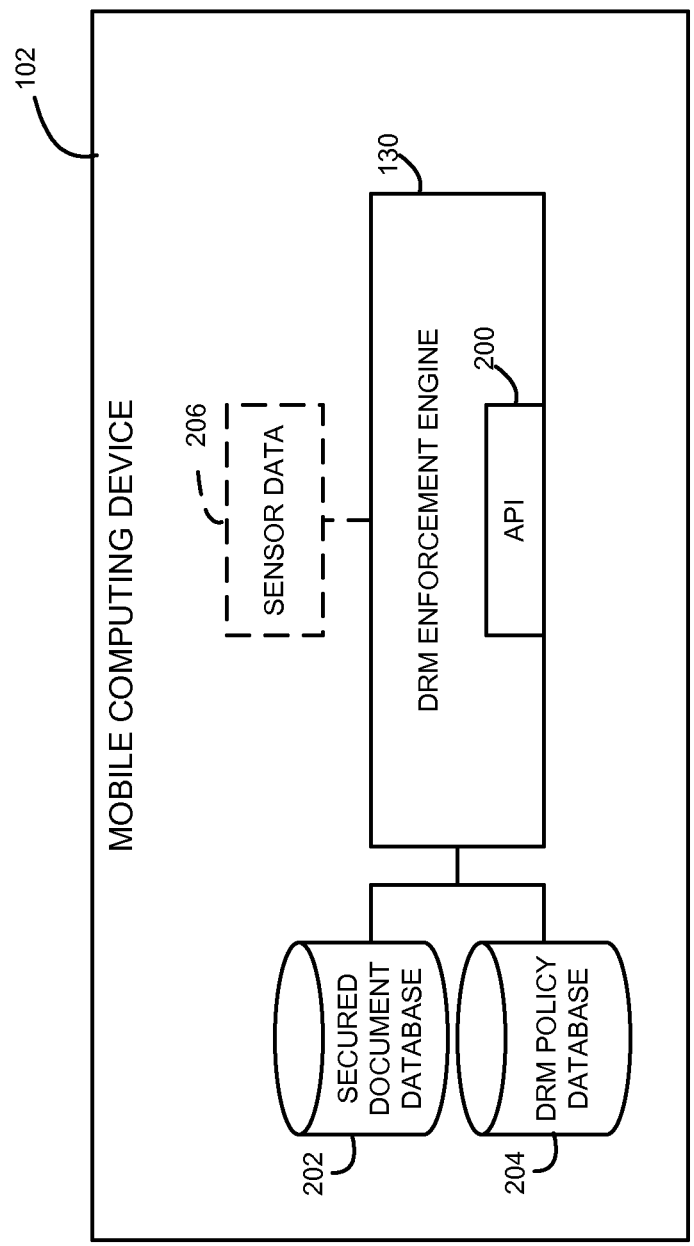
FIG. 2 is a simplified block diagram of a software environment of the mobile computing device of FIG. 1.

Referring now to FIG. 2, the DRM enforcement engine 130 is embodied as hardware and associated firmware/software modules and devices as discussed above. In the illustrative embodiment, the DRM enforcement engine 130 includes an application program interface (API) 200 to facilitate interaction between the DRM enforcement engine 130 and local applications or software services on the mobile computing device 102. Such local applications may be embodied as any software or firmware application (e.g., a word processing application) executed on the mobile computing device 102 that requests access to a document whose digital rights are managed by the DRM enforcement engine 130.

The mobile computing device 102 also includes a secured document database 202 and a local DRM policy database 204. The databases 202, 204 are stored in the secured memory 132 and may be embodied as any type of database such as a relational database, a flat file database, or other data structure. In some embodiments, the secured document database 202 and the DRM policy database 204 may be encrypted or otherwise include some form of security. As discussed above, the mobile computing device 102 communicates with the EDRM server 104 to retrieve a secured document and an associated usage rights policy. The DRM enforcement engine 130 of the mobile computing device 102 is configured to store any secured document downloaded from the EDRM server 104 in the secured document database 202 and store the associated usage rights policy in the DRM policy database 204. The DRM enforcement engine 130 controls usage of the secured document based on the usage rights policy stored in the DRM policy database 204. Additionally, in embodiments in which the mobile computing device 102 includes one or more sensors 134, the DRM enforcement engine 130 may be configured to enforce the document usage rights policy based, in part, on sensor data 206 received from the sensor(s) 134.

Figure 3:
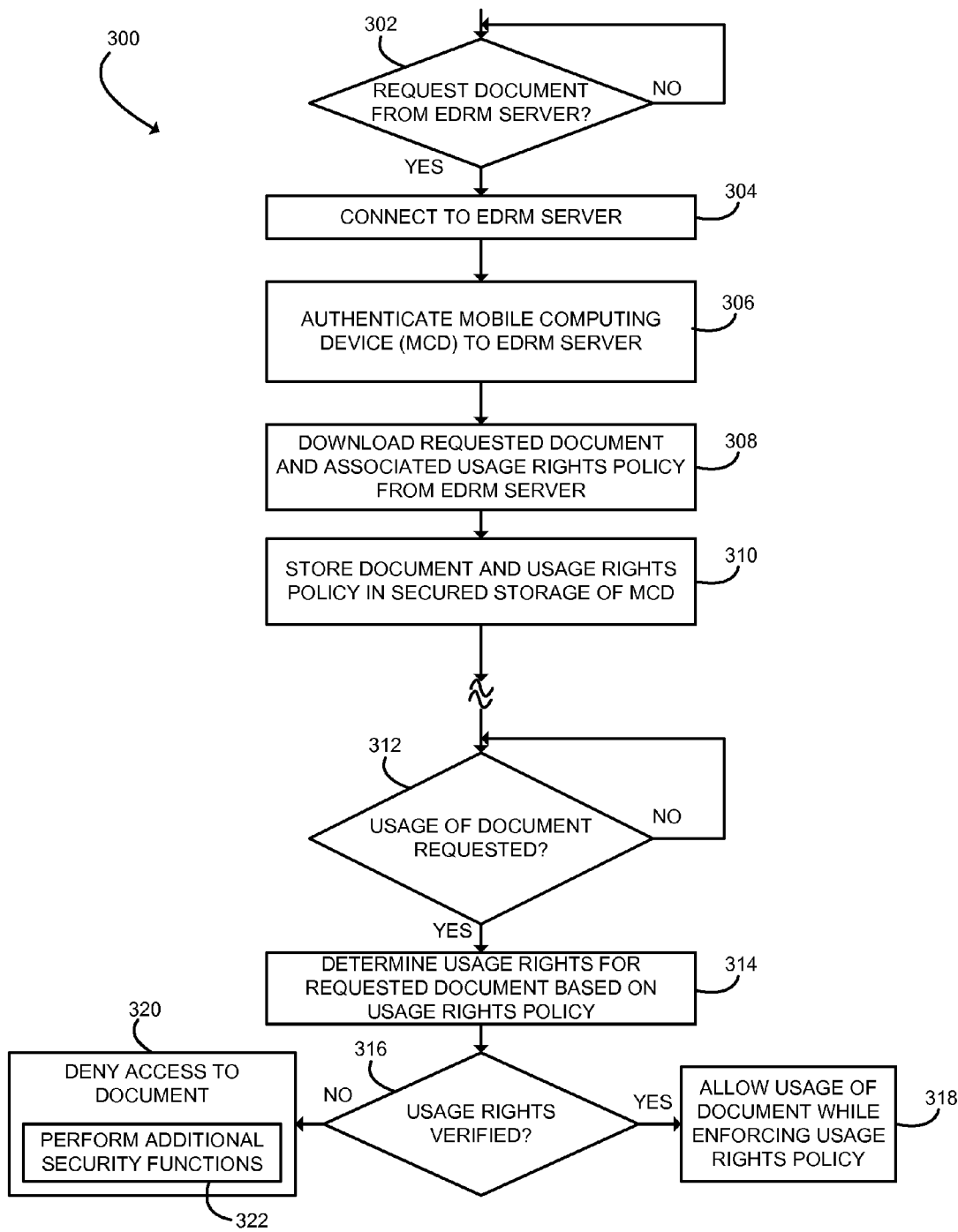
FIG. 3 is a simplified flow diagram of one embodiment of a method for managing digital usage rights of documents on the mobile computing device of FIG. 1.

Referring now to FIG. 3, in use, the mobile computing device 102 may be configured to execute a method 300 for managing digital usage rights of documents on the device 102. For example, the method 300, or portions thereof, may be executed by the DRM enforcement engine 130. The method 300 begins with block 302 in which the mobile computing device 102 determines whether a user has requested access to a secured document stored on the EDRM server 104. If so, the method 300 advances to block 304 in which the mobile computing device 102 connects to the EDRM server 104 over the network 106. In block 306, the mobile computing device 102 is authenticated to the EDRM server 104. The mobile computing device 102 may be authenticated using any suitable methodology and technology. For example, the mobile computing device 102 may be authenticated based on a unique identification key of the mobile computing device 102 (e.g., a Media Access Control (MAC) address, a Globally Unique Identifier (GUID), or the like). Additionally or alternatively, the mobile computing device 102 may be authenticated based on one or more encryption keys, passwords, passkeys, biometric data, and/or other security measure.

If the mobile computing device 102 is not properly authenticated in block 306, the EDRM server 104 rejects the request and the method 300 ends. However, if the mobile computing device 102 is successfully authenticated in block 306, the mobile computing device 102 downloads the requested secured document from the EDRM server 104 in block 308. Additionally, the mobile computing device 102 downloads the associated document usage rights policy for the requested document in block 308. As discussed above, in some embodiments, the secured document and usage rights policy may be downloaded from the EDRM server 104 in an encrypted format. In block 310, the DRM enforcement engine 130 of the mobile computing device 102 stores the downloaded document in the secured document database 202 and stores the associated usage rights policy in the DRM policy database 204. It should be appreciated that the mobile computing device 102 may retrieve and store multiple secured documents and associated usage rights policies from the EDRM server 104. As such, the mobile computing device 102 may have multiple documents and policies stored in the databases 202, 204, respectively, at any point in time.

After the mobile computing device 102 has retrieved and stored the requested document and associated usage rights policy from the EDRM 104, the user of the mobile computing device 102 may request access or usage of the document in block 312. If so, the method 300 advances to block 314 in which the usage rights for the requested documents is determined. To do so, the DRM enforcement engine 130 may retrieve the usage rights policy associated with the requested document from the DRM policy database 204. The DRM enforcement engine 130 may subsequently determine the current usage rights for the requested document based on the usage rights policy. As discussed above, the usage rights policy defines the digital rights associated with the document, which may include any digital right commonly associated with documents such as viewing rights, saving rights, modification rights, deletion rights, etc. The document usage rights policy also correlates the digital rights to particular criteria such as the identity of the user of the mobile computing device 102, the identity of the mobile computing device 102, the location of the mobile computing device 102, the current date and/or time, the validity of a passkey or password, the connectivity status of the EDRM server 104, and/or other criteria such as those criteria commonly associated with enterprise digital rights management systems. In embodiments in which the mobile computing device 102 includes the one or more sensors 134, the DRM enforcement engine 130 may determine the current usage rights for the requested document based on the usage rights policy and the sensor data 206. For example, if the associated usage rights policy dictate that the document may only be viewed when the mobile computing device is at a particular location (e.g., at work), the DRM enforcement engine 130 is configured to determine the location of the mobile computing device 102 based on the sensor data 206.

In block 316, the DRM enforcement engine 130 verifies the usage rights for the document. That is, the DRM enforcement engine 130 determines whether the requested usage of the document (e.g., viewing, modification, storing, deletion, etc.) is verified based on the additional criteria (e.g., identity of user, identity of device 102, location, time, date, passkey authentication, etc.) set forth in the associated usage rights policy. If so, the DRM enforcement engine 130 retrieves the secured document from the secured document database 202 and allows the requested usage of the document on the mobile computing device 102 while enforcing the usage rights policy for the document in block 318. However, if the DRM enforcement engine 130 determines that the requested usage of the document is not verified (e.g., the user requested modifications to the documents when the usage rights policy forbids such modifications), the DRM enforcement engine 130 denies access to the secured document in block 320. Additionally, in some embodiments, the DRM enforcement engine 130 may perform additional security functions in block 322 such as, for example, recording a security violation, alerting the EDRM server 104, displaying a warning to a user of the mobile computing device 102, and/or one or more addition security functions. In this way, the DRM enforcement engine 130 of the mobile computing device 102 provides a local point of enforcement of the digital usage rights policy associated with secured documents.

Figure 4:
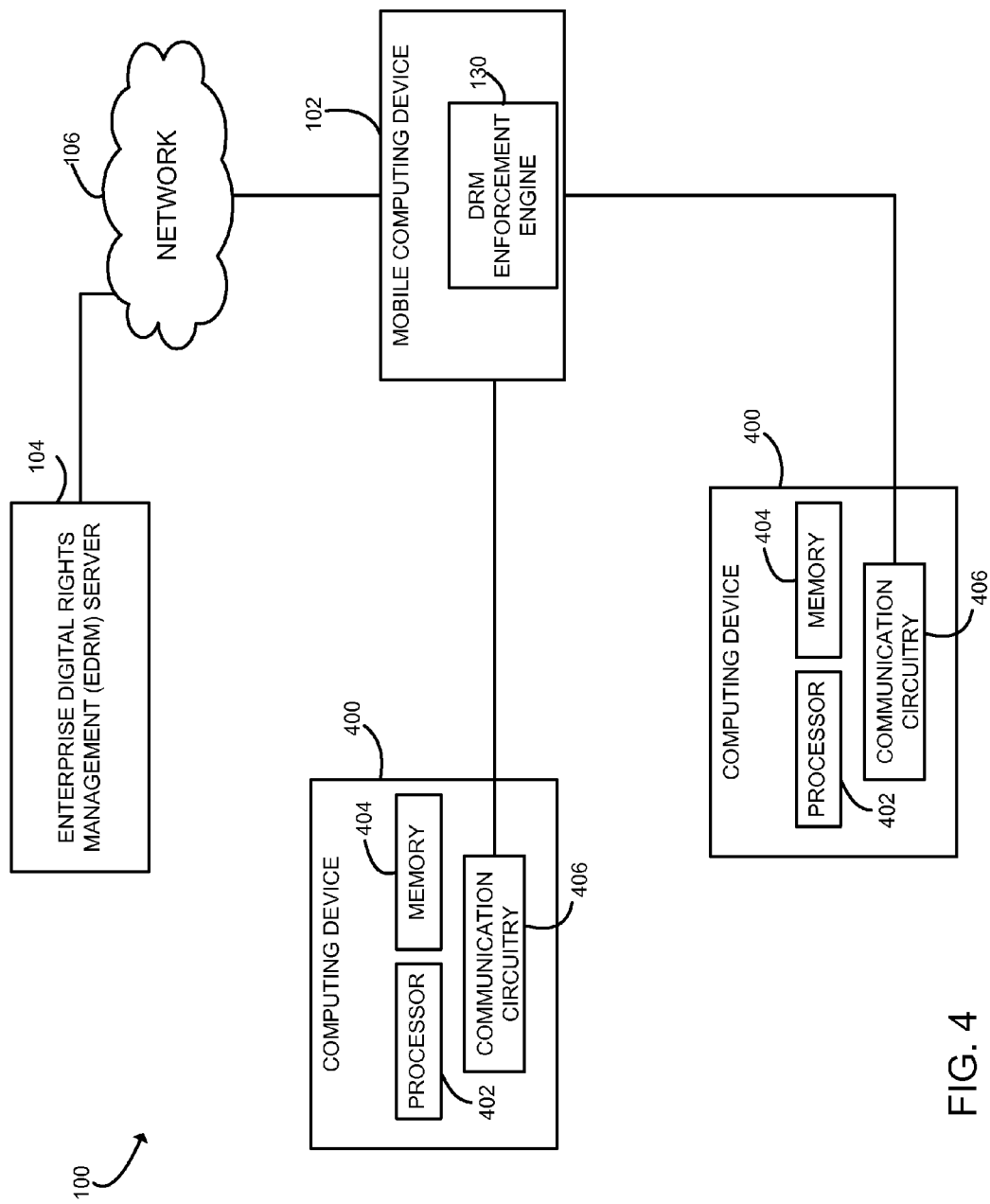
FIG. 4 is a simplified block diagram of another embodiment of a system for managing digital usage rights of documents.

Referring now to FIG. 4, in some embodiments, the system 100 may also include one or more additional computing devices 400. The additional computing devices 400 may not be capable of communicating directly with the EDRM server 104 and/or over the network 106. However, the additional computing devices 400 may be capable of communicating with the mobile computing device 102 directly over a personal area network (PAN) or the like (e.g., using infrared (IR) communications, Bluetooth® communications, Near Field Communications (NFC), etc.). In such embodiments, as discussed in more detail below, the mobile computing device 102 may act as a proxy for the additional computing devices 400 to retrieve secured documents from the EDRM server 104 and/or as a local EDRM server to the computing devices 400 when access to the EDRM server 104 is unavailable.

The additional computing devices 400 may be embodied as any type of computing device capable of performing the functions described herein. For example, the computing devices 400 may be embodied as a desktop computer, a laptop computer, a smart phone, a mobile internet device, a handheld computer, a digital tablet, a personal digital assistant, a telephony device, or other mobile or stationary computing device. In the illustrative embodiment of FIG. 4, each additional computing device 400 includes a processor 402, a memory 404, and communication circuitry 406. In some embodiments, several of the foregoing components may be incorporated on a motherboard of the computing device 400, while other components may be communicatively coupled to the motherboard via, for example, a peripheral port. Furthermore, it should be appreciated that the computing devices 400 may include other components, sub-components, and devices commonly found in a computing device, which are not illustrated in FIG. 4 for clarity of the description.

The processor 402 of the computing devices 400 may be embodied as any type of processor capable of executing software/firmware, such as a microprocessor, digital signal processor, microcontroller, or the like. Additionally, the processor 402 may be embodied as a single core processor, a multi-core processor, or multiple processors, each having one or more cores. The memory 404 of the computing devices 400 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Various data and software may be stored in the memory device 404. For example, one or more operating systems, applications, programs, libraries, and drivers that make up the software stack executed by the processor 402 may reside in memory 404 during execution. The communication circuitry 406 of the computing devices 400 may be embodied as any number of devices and circuitry for enabling communications between the computing devices 400 and the mobile computing device 102 such as an IR transmitter, a Bluetooth® transmitter, an NFC transmitter, and/or the like. However, the communication circuitry 406 may not support communications over the network 106 with the EDRM server 104 in some embodiments.

Figure 5:
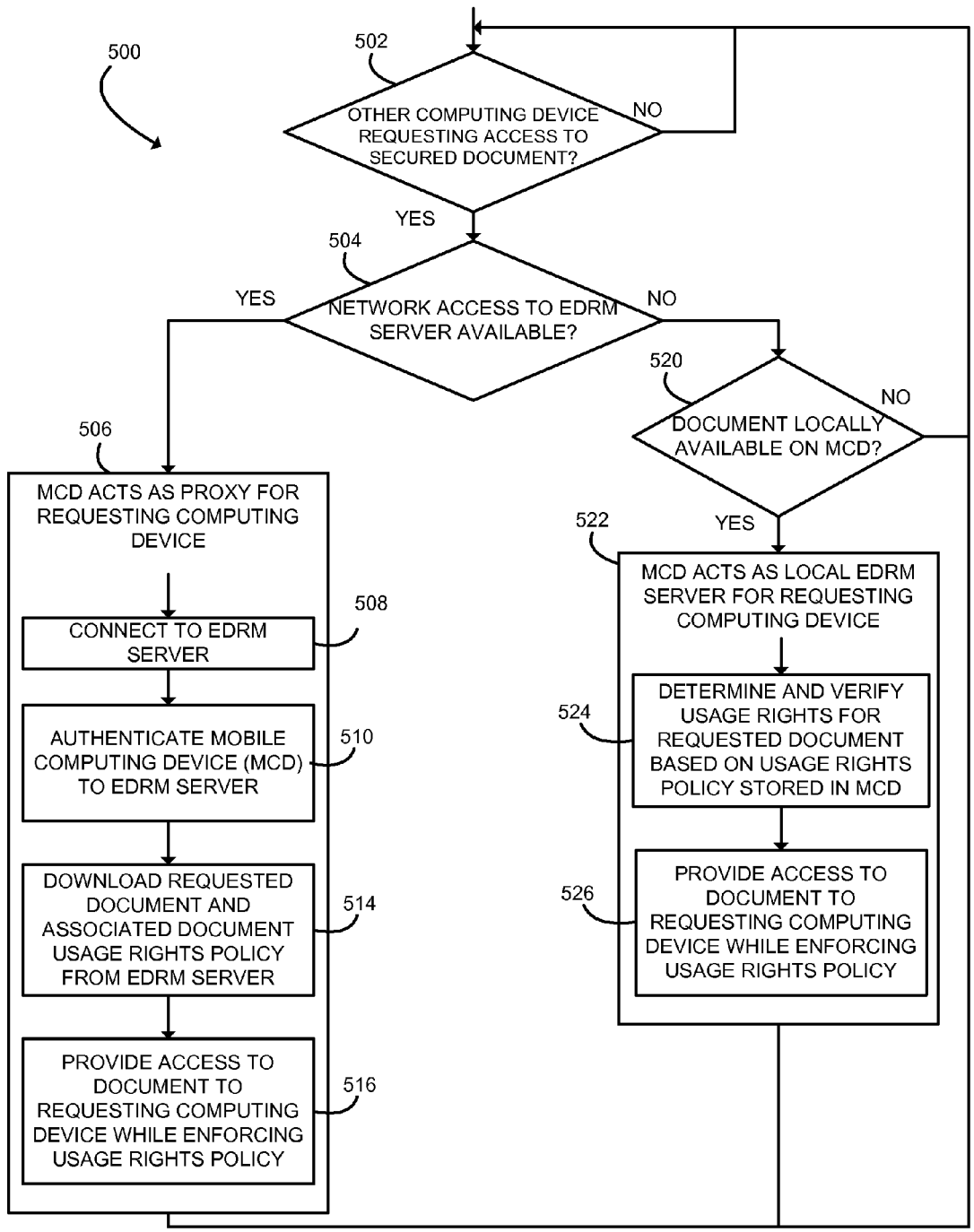
FIG. 5 is a simplified flow diagram of one embodiment of a method for managing digital usage rights of documents accessed on computing devices of the system of FIG. 4.

Referring now to FIG. 5, in use, the mobile computing device 102 may be configured to execute a method 500 for managing digital usage rights of documents accessed on the computing devices 400. For example, the method 500, or portions thereof, may be executed by the DRM enforcement engine 130 of the mobile computing device 102. The method 500 begins with block 502 in which the mobile computing device 102 determines whether a request to access a secured document has been received from one of the additional computing devices 400. As discussed above, the computing devices 400 may be configured to communicate with the mobile computing device 102 over a personal area network using such communication technologies as, for example, IR communications, Bluetooth® communications, Near Field Communications, and/or the like.

If the mobile computing device 102 has received a request for a secured document from one of the additional computing devices 400, the method 500 advances to block 504. In block 504, the mobile computing device 102 determines whether network access to the EDRM server 104 is available. If so, the mobile computing device 102 acts as a proxy for the requesting computing device 400 by downloading the secured document from the EDRM server 104 in block 506. To do so, the mobile computing device 102 connects to the EDRM server 104 over the network 106 in block 508. In block 510, the mobile computing device 102 is authenticated to the EDRM server 104. As discussed above, the mobile computing device 102 may be authenticated using any suitable methodology and technology. For example, the mobile computing device 102 may be authenticated based on a unique identification key of the mobile computing device 102 (e.g., a Media Access Control (MAC) address, a Globally Unique Identifier (GUID), or the like). Additionally or alternatively, the mobile computing device 102 may be authenticated based on one or more encryption keys, passwords, passkeys, biometric data, and/or other security measure.

If the mobile computing device 102 is not properly authenticated in block 510, the EDRM server 104 rejects the request and the method 500 ends. However, if the mobile computing device 102 is successfully authenticated in block 510, the mobile computing device 102 downloads the requested secured document from the EDRM server 104 in block 514. Additionally, the mobile computing device 102 downloads the associated usage rights policy for the requested document in block 514. As discussed above, in some embodiments, the secured document and usage rights policy may be downloaded from the EDRM server 104 in an encrypted format. The DRM enforcement engine 130 of the mobile computing device 102 stores the downloaded document in the secured document database 202 and stores the associated usage rights policy in the DRM policy database 204.

After the mobile computing device 102 has retrieved and stored the requested document and associated usage rights policy from the EDRM 104, the mobile computing device 102 provides access to the document to the requesting computing device 400 while enforcing the usage rights policy associated with the document in block 516. For example, if the DRM enforcement engine 130 of the mobile computing device 102 determines, from the associated usage rights policy, that the document should not be accessed at the current location, the DRM enforcement engine 130 may deny access to the additional computing devices 400 in block 516.

Referring now back to block 504, if the mobile computing device 102 determines that network access to the EDRM server 104 is not available, the method 500 advances to block 520. In block 520, the DRM enforcement engine 130 of the mobile computing device 102 determines whether the document requested by the additional computing device 400 is stored locally on the mobile computing device 102 (e.g., stored in the secured document database 202). If not, the requested document is unavailable at the present time and the method 500 loops back to block 502.

However, if the mobile computing device 102 does include a locally stored copy of the requested document, the method 500 advances to block 522 in which the mobile computing device acts as a local EDRM server for the requesting computing device 400. To do so, the DRM enforcement engine 130 of the mobile computing device 102 determines and verifies the current usage rights for the requested document based on the usage rights policy in block 524. For example, the DRM enforcement engine 130 may retrieve the usage rights policy associated with the requested document from the DRM policy database 204. The DRM enforcement engine 130 may subsequently determine the current usage rights for the requested document based on the usage rights policy and, in some embodiments, on the sensor data 206 as discussed in detail above. Additionally, the DRM enforcement engine 130 verifies the usage rights for the document. That is, the DRM enforcement engine 130 determines whether the requested usage of the document (e.g., viewing, modification, storing, deletion, etc.) is verified based on the additional criteria (e.g., identity of user, identity of device 102, location, time, date, passkey authentication, etc.) set forth in the associated usage rights policy. If so, the mobile computing device 102 provides access to the document to the requesting computing device 400 while enforcing the usage rights policy associated with the document in block 526.

while the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
   establishing a digital rights management (DRM) enforcement engine on a mobile computing device;
   downloading a document and an associated document usage rights policy from a server to the mobile computing device;
   storing the document and the associated document usage rights policy in a secured storage on the mobile computing device;
   enforcing the associated document usage rights policy of the document on the mobile computing device using the DRM enforcement engine;
   receiving a request, on the mobile computing device, from another computing device for the document stored on the server;
   determining whether the document is locally stored on the mobile computing device;
   determining whether a network connection to the server is available; and
   in response to (i) the document being locally stored on the mobile computing device and (ii) the network connection to the server being unavailable, providing access to the document stored on the mobile computing device to the another computing device pursuant to the associated document usage rights policy of the document stored on the mobile computing device.

2. The method of claim 1, wherein establishing a DRM enforcement engine comprises establishing a DRM enforcement engine on a security processor of the mobile computing device.

3. The method of claim 1, wherein downloading the document and the associated document usage rights policy comprises authenticating the mobile computing device to the server and downloading the document and the associated document usage rights policy in response to the mobile computing device being authenticated.

4. The method of claim 1, wherein downloading the document and the associated document usage rights policy comprises downloading the document and the associated document usage rights policy from an enterprise digital rights management (EDRM) server over a network.

5. The method of claim 1, wherein downloading the associated document usage rights policy comprises downloading an associated document usage rights policy that correlates digital usage rights to the document based on at least one of: the identity of the mobile computing device, the identify of the user of the mobile computing device, the location of the mobile computing device, the current date, the current time, a passkey, and connectivity status to an enterprise digital rights management (EDRM) server.

6. The method of claim 5, wherein the digital usage rights to the document include at least one of: viewing rights, modification rights, printing rights, and saving rights.

7. The method of claim 1, wherein storing the document and the associated document usage rights policy comprises storing the document and the associated document usage rights policy in a secured memory space on the mobile computing device that has been dedicated to a security processor of the mobile computing device.

8. The method of claim 1, wherein storing the document comprises storing the storing the document in an encrypted format.

9. The method of claim 1, wherein enforcing the associated document usage rights policy comprises providing digital usage rights to the document on the mobile computing device pursuant to the associated usage rights policy.

10. The method of claim 9, wherein the digital usage rights to the document include at least one of: viewing rights, modification rights, printing rights, and saving rights.

11. The method of claim 1, further comprising receiving sensor data from a sensor of the mobile computing device, and
   wherein enforcing the associated document usage rights policy comprises providing access to the document on the mobile computing device based on the associated document usage rights policy and the sensor data.

12. The method of claim 1, further comprising:
   receiving a request, on the mobile computing device, from another computing device for a secured document stored on the server;
   downloading the secured document and a document usage rights policy of the secured document from the server to the mobile computing device in response to receiving the request;
   storing the secured document and the document usage rights policy of the secured document in the secured storage of the mobile computing device; and
   providing access to the secured document to the another computing device pursuant to the documents usage rights policy of the secured document.

13. One or more non-transitory, computer-readable media comprising a plurality of instructions that in response to being executed result in a mobile computing device:
   establishing a digital rights management (DRM) enforcement engine in a security processor of the mobile computing device;
   receiving a request for a document via the mobile computing device;
   downloading the document and an associated document usage rights policy from a server to a secured storage of the mobile computing device in response to receiving the request;
   providing access to the document on the mobile computing device while enforcing the associated document usage rights policy using the DRM enforcement engine;
   receiving a request from another computing device for the document stored on the server;
   determining whether the document is locally stored on the mobile computing device and whether a network connection to the server is available; and
   in response to (i) the document being locally stored on the mobile computing device and (ii) the network connection to the server being unavailable, providing access to the document stored on the mobile computing device to the another computing device pursuant to the associated document usage rights policy of the document stored on the mobile computing device.

14. The one or more non-transitory, computer-readable media of claim 13, wherein the plurality of instructions further result in the mobile computing device:
   receiving sensor data from a sensor of the mobile computing device; and
   providing access to the document on the mobile computing device based on the associated document usage rights policy and the sensor data.

15. The one or more non-transitory, computer-readable media of claim 13, wherein the plurality of instructions further result in the mobile computing device:
   receiving a request from another computing device for a secured document stored on the server;

downloading the secured document and a document usage rights policy of the secured document from the server to the secured storage of the mobile computing device in response to receiving the request; and providing access to the secured document to the another computing device pursuant to the documents usage rights policy of the secured document.

16. A mobile computing device comprising:

a digital rights management (DRM) enforcement engine;

a processor; and a memory device having stored therein a plurality of instructions, which when executed by the processor, cause the DRM enforcement engine to:

download a document and an associated document usage rights policy from a server to the mobile computing device;

store the document and the associated document usage rights policy in a secured memory location of the memory device;

enforce the associated document usage rights policy of the document on the mobile computing device using the DRM enforcement engine;

receive a request from another computing device for the document stored on the server;

determine whether the document is locally stored on the mobile computing device;

determine whether a network connection to the server is available; and in response to (i) the document being locally stored on the mobile computing device and (ii) the network connection to the server being unavailable, provide access to the document stored on the mobile computing device to the another computing device pursuant to the associated document usage rights policy of the document stored on the mobile computing device.

17. The mobile computing device of claim 16, wherein the digital rights management (DRM) enforcement engine comprises a security co-processor.

18. The mobile computing device of claim 16 further comprising a sensor, wherein the plurality of instructions further cause the DRM enforcement engine to enforce the associated document usage rights policy of the document based on sensor data received from the sensor.

* * * * *